United States Patent [19]
Zulian

[11] Patent Number: 5,165,028
[45] Date of Patent: Nov. 17, 1992

[54] CACHE MEMORY HAVING PSEUDO VIRTUAL ADDRESSING

[75] Inventor: Ferruccio Zulian, Cornaredo, Italy

[73] Assignee: Honeywell Bull Italia S.p.A., Caluso, Italy

[21] Appl. No.: 320,259

[22] Filed: Mar. 7, 1989

[30] Foreign Application Priority Data

Mar. 15, 1988 [IT] Italy .................. 19771 A/88

[51] Int. Cl.⁵ .................................. G06F 12/10
[52] U.S. Cl. ................................ 395/400; 395/425;
364/DIG. 1; 364/DIG. 2; 364/243.4;
364/256.3; 364/961.2
[58] Field of Search ... 364/200 MS File, 900 MS File;
395/400

[56] References Cited

U.S. PATENT DOCUMENTS

| | | | |
|---|---|---|---|
| 4,386,402 | 5/1983 | Toy | 364/200 |
| 4,400,774 | 8/1983 | Toy | 364/200 |
| 4,550,368 | 10/1985 | Bechtolsheim | 364/200 |
| 4,737,909 | 4/1988 | Harada | 364/200 |
| 4,803,621 | 2/1989 | Kelly | 364/200 |
| 4,884,197 | 11/1989 | Sachs et al. | 364/200 |

Primary Examiner—Gareth D. Shaw
Assistant Examiner—Brian L. Klock
Attorney, Agent, or Firm—J. H. Phillips; J. S. Solakian

[57] ABSTRACT

Cache memory having pseudo virtual addressing, in which the addressing is performed by using the "offset" field of a current address and a physical address field of an address previously used and stored in a first register, and where, for each logical current address a comparison is made between the logical page addresses of the current address and that of the last used physical address which is stored in a second register. Along with the requested information the cache memory outputs, if available, the effective physical page address of the information, which is compared with the physical page address used for addressing and stored in the first register. In this way, the addressing is performed by physical addresses but without need to wait for translation of a virtual/logical address into a physical address.

4 Claims, 2 Drawing Sheets

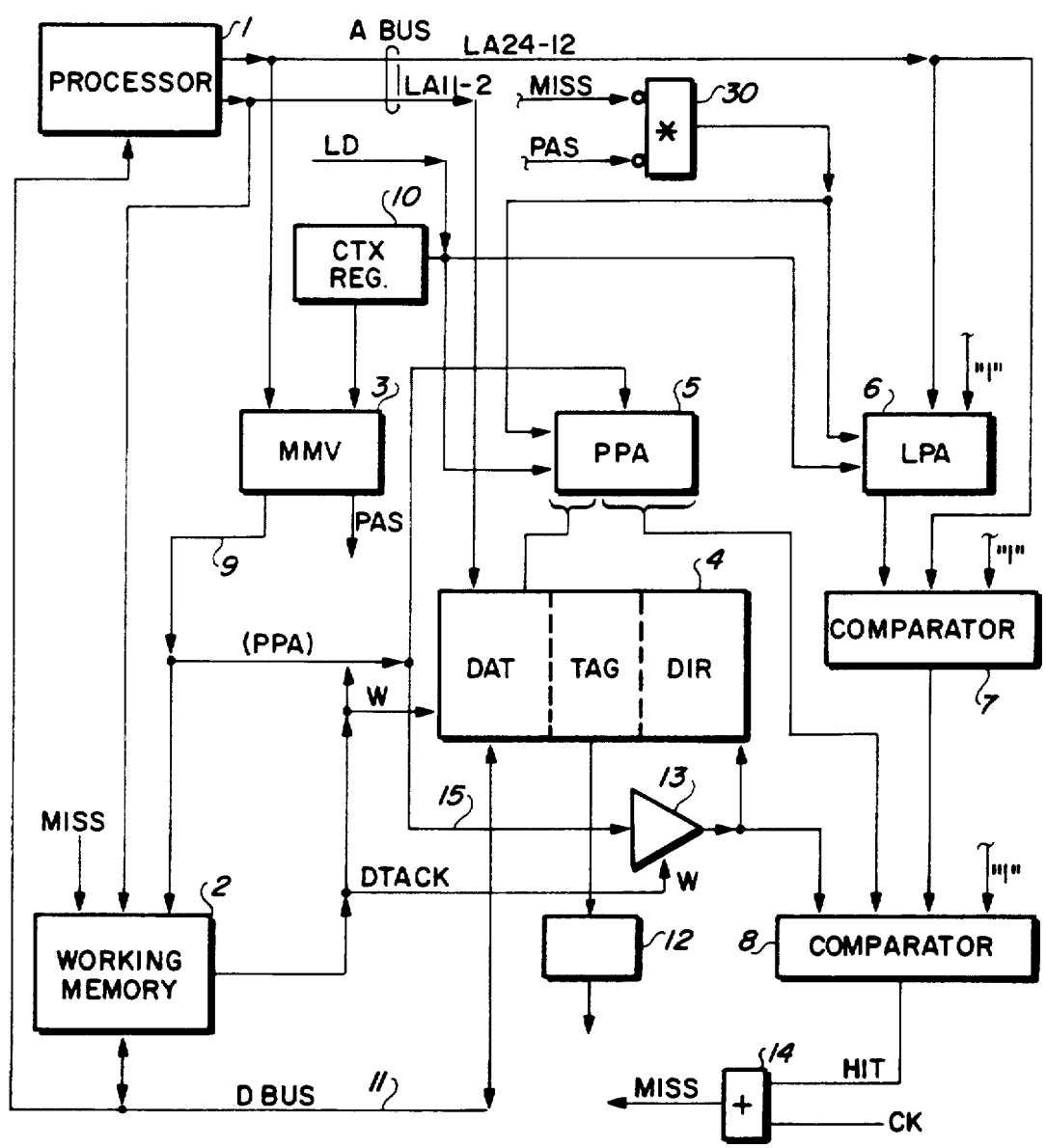

CACHE MEMORY HAVING PSEUDO VIRTUAL ADDRESSING

FIELD OF THE INVENTION

The present invention relates to a cache memory having pseudo virtual addressing.

BACKGROUND OF THE INVENTION

It is known that in modern data processing systems the speed at which a processor may operate on information is much greater than the speed at which information can be provided to the processor by a working memory.

Among the arrangements most commonly used to overcome this problem, there is the use of buffer memories or caches having a small capacity but operating at very high speed. They are used to temporarily store those portions of the main memory contents which are likely to be needed by the processor for immediate use.

Basically a cache may be considered an associative memory having a plurality of memory locations: in each location a copy of a datum stored in working memory is contained, as well as the corresponding main memory address where the datum is stored.

When the cache receives a memory address, it is compared with all the addresses contained in the cache and, if a match occurs, the information related to the address for which match occurs is output.

In practice, this association is obtained by dividing a memory address in two parts, a more significant one and a least significant.

The least significant part is used to address a high speed memory which, at each addressed location, contains a datum and the most significant portion of the datum's address.

The most significant part of the effective address, read out from the high speed memory, is compared with the most significant portion of the main memory address. If they match, the data information read out from the cache is validated by a HIT signal to indicate that it is effectively the information related to the full referencing address.

In a data processing system which makes use of the "virtual memory" concept, the addresses generated by a processor to reference the working memory are logical or virtual addresses and differ from the physical addresses which are effectively used to reference the working memory.

Virtual or logical addresses, before being forwarded to the working memory, must be "translated" into physical addresses by a memory management unit or MMU.

The MMU, in turn, may be considered a cache of addresses.

Thus, two alternatives are available to fast memories commonly defined as caches (data caches as opposed to memory management units). They may be referenced by either a physical or a logical address.

Both alternatives have been used and each one has its own advantages and trade-offs.

Addressing of a cache with a physical address requires the previous translation of the logical address into a physical address: the time required to get the referenced information from the cache is the sum of the address translation time performed by the MMU and the cache memory access time.

In several applications this delay is unacceptable.

In the other alternative, addressing of a cache by logical addresses, the time required to get the referenced information from the cache is only the access time of the cache.

However this approach requires an unambiguous relation between a logical address and a physical address.

At logical address level, synonyms must not exist.

Should this occur the same information could be duplicated in several cache locations and could cause information inconsistencies which must be avoided.

These problems, which find solution by way of expensive expedients or with heavy limitations at programming level, discourage the use of logical addresses for cache references.

An alternative to the two approaches flows from the fact that in general logical addresses and physical addresses are not completely different but contain a bit field, the least significant one, which is named "offset" and coincides in both the logical and physical address.

It is therefore possible to address a cache with the "offset" field only, which however limits the cache capacity to the only range of locations which may be addressed with the "offset" (generally 1K of addressable locations).

Unfortunately, to obtain good performances from a cache it is required to have cahes with a much greater capacity in the order of 4-16K addressable locations.

The European patent application published with N. 206050 on 30.12.86, which is also referenced for a more detailed consideration of the problems involved in cache memories, proposes an alternative solution of the above mentioned problems, and provides for the addressing of a cache by means of a logical or virtual address, or more properly a portion thereof, and the simultaneous addressing of a memory management unit or "Translation Buffer", with the same logical address to obtain the corresponding physical address.

The cache memory outputs, in addition to the requested information (if present) the physical address related to that information (obviously excluding the "offset" field), so that, if the retrieved physical address matches with the physical address generated by the "Translation Buffer", there is the confirmation, or HIT, that the retrieved information is the requested one.

In this way, the Translation Buffer and the cache memory work in parallel or overlapping in time.

It is therefore clear that the time required to obtain a datum is determined by the greater of the access time of the Translation Buffer and the access time of the cache memory, plus the time required to compare the addresses in output from the two elements.

In general, the translation time of a logical address into a physical address is no less than the cache access time. Therefore the speed at which a cache may provide valid information may be limited with this approach by the operative time of the Translation Buffer.

Moreover, the problem of synonyms in the logical addresses, even if reduced, is not completely overcome; it must be avoided that logical addresses, differing in that portion which is used to address the cache, may reference the same information.

These limitations are completely overcome by the cache memory of the present invention, which may be defined as having a pseudo virtual addressing.

SUMMARY OF THE INVENTION

The cache memory of the invention uses the criterion of address sequentiality, which is followed in the ordering of data and instructions, owing to which the address of a datum requested for use subsequent to a currently used datum generally differs from the address of the currently used datum only in the least significant bits, the only exceptions to this criterion consisting in branches, changes from data of one kind to data of a different kind (operands, instructions) or page transitions (or other memory addressing block transitions) from one memory page to a next one.

This criterion is followed both at logical address level and at physical address level.

Therefore, if in the fetching of a current datum a relation is established between a physical address and a logical address of that current datum, the fetching of the next following datum from a cache, if the logical address of the next following information differs from the logical address of the current datum only in the least significant bits (offset), may be performed by using the most significant portion of the current datum physical address, plus the "offset" address bits (logical and physical) of the next following datum.

Since the physical address of a current datum is already available when the next following datum is to be fetched, the speed at which the next following datum can be obtained is limited only be the cache access time.

Moreover the problem of synonym is completely avoided.

According to a further aspect of the invention, the cache memory is organized in a plurality of association sets, distinct for instructions, global data, and stack data, so that the cache structure performs faster and exhibits a higher HIT rate.

The features and the advantages of the invention will appear more clearly from the following description of a preferred embodiment of the invention and from the enclosed drawings where:

BRIEF DESCRIPTION OF THE DRAWINGS

FIG. 1 shows the generic structure of a logical or virtual address.

FIG. 2 shows the structure of a physical memory address.

FIG. 3 shows in block diagram a form of embodiment of cache memory in accordance with the present invention.

DETAILED DESCRIPTION

Figure 4:
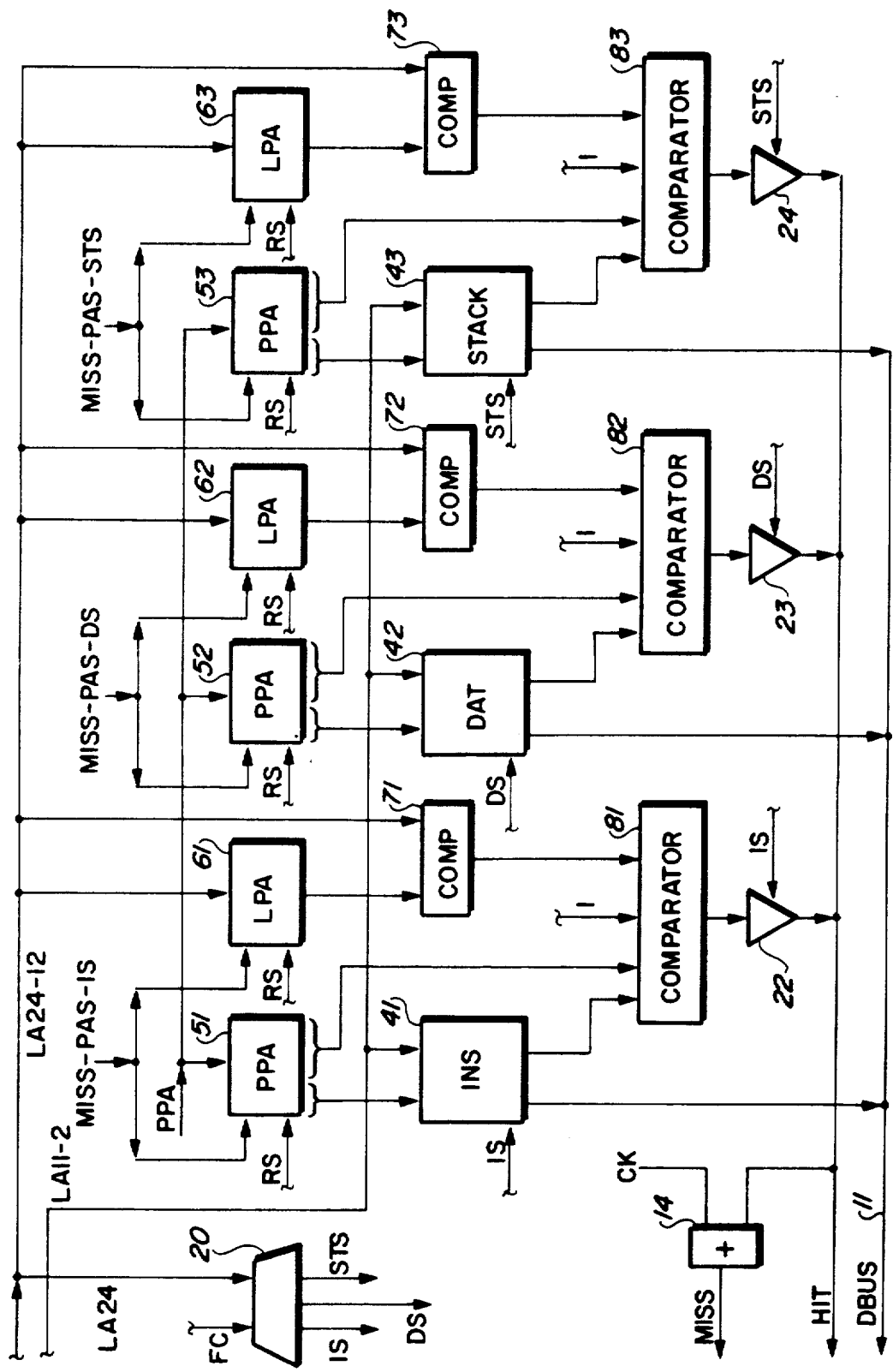
FIG. 4 shows in block diagram a preferred form of embodiment of cache memory in accordance with the present invention.

The most significant bit field, in FIG. 1 bits from 12 to 24, defines a logical or virtual memory page address.

The least significant bit field (Offset) from 0 to 11 defines an address within a virtual page.

In general the unit of addressable information is a byte, whilst the memory parallelism, currently used, as well as the processing parallelism is of 4 bytes. Therefore, for the purpose of memory addressing the two least significant bits of the "offset" field are ignored.

FIG. 2 shows the generic structure of a physical address. The least significant bit field from 0 to 11 constitutes an "offset" which defines an address within a physical memory page. As already indicated the contents of this field coincide with the contents of the "offset" field of a corresponding virtual address.

The most significant bit field, in FIG. 2 from 12 to 20, defines a physical address of memory page.

The length of this field may be equal to, greater than or, as shown in the figure, lesser than the length of the corresponding field of the virtual address.

Generally the addressable virtual space is much greater than the memory storage capacity.

By the adoption of the "context" concept the virtual space is further broadened.

A virtual space corresponds to each context.

The adoption of these criteria in the information organization has some implication on the relation which is established among logical addresses and physical addresses.

In different contexts or processes the same logical address may be related to different physical addresses and therefore to information which may be different.

Within the same context, the same logical address, whenever used, must be always related to the same physical address to avoid ambiguities and uncertainty.

On the contrary, both in case of the same or differing contexts, two or more logical addresses, differing from each other, may be related to the same physical address and possibly, but not necessarily if the time dimension is considered, to the same information.

Therefore synonym already mentioned may occur.

These considerations will be useful in the following to clarify the advantages of the invention.

FIG. 3 shows in simplified block diagram a cache memory implemented in accordance with the present invention, inserted, for sake of clarity, in the architecture of a data processing system comprising a processor 1, a working memory 2 and a memory management unit MMU 3.

The cache comprises a read-write fast memory 4, having for instance 4K entries or memory addressable locations, two registers 5,6 and two comparators 7,8.

Processor 1, for instance a microprocessor 68020 of the Motorola firm, produces a logical address which is put on an address channel ABUS and is distributed to memory 2, to MMU 3, to cache fast memory 4, to registers 5,6 and comparator 7.

The "offset" bits LA11-2 are input to address inputs of memory 2 and fast memory 4.

Bits LA24-12 of the logical address are input to address inputs of MMU 3, to the inputs of register 6 and to a first input set of comparator 7.

Register 6 receives as input a bit steadily at logical level 1 in addition to bits LA24-12.

The outputs of registers 6 are connected to a second input set of comparator 7.

The first input set of comparator 7 receives a bit steadily at logical level 1 in addition to bits LA24-12.

MMU 3 outputs on channel 9 a physical page address PPA which is input to memory 2 and to register 5.

A signal PAS, generated by MMU 3, validates the physical page address PPA, when it is asserted.

MMU 3 may be suitably of the type described in U.S. Pat. No. 4,550,368 and capable of providing physical addresses related to logical addresses for a plurality of translation spaces or contexts.

To this purpose a context register 10 or CTX REG, loaded by processor 1, provides MMU 3 with a binary context code.

Register 10 is loaded by a command LD generated by processor 1. The same LD command is used to reset registers 5,6 for the reasons which will be explained in the following.

The two registers are loaded with the information present at their input by a load command obtained as the logical AND (gate 30) of signal PAS asserted and a signal MISS asserted.

MISS signal will be described in the following.

Fast memory 4 is addressed by the "offset" bit LA11-2 and further by a certain number of the least significant bits of the physical page address PPA stored in register 5.

The number of these bits depends on the capacity of the fast memory 4.

For a capacity of 8K entries, the 3 least significant bits of the physical page address are used in addition to the 10 bits LA11-2.

Each location or entry of the fast memory 4 is divided into three fields: a data field DAT, for storing four data/instruction information bytes, a field TAG comprising a small number of bits, and storing information which characterizes the data/instruction information as valid, invalid, readable only, usable by supervisor program only, or by user program, and so on; a third field, DIR storing a portion of the effective physical page memory address (with the exclusion of the least significant bits used for addressing fast memory 4) where copy is stored of the data/instruction information contained in the same cache entry.

Fast memory 4 has bidirectional input/output for information to be stored or read out.

The input/output is divided into three sets, each corresponding to an entry field.

The input/output set corresponding to the data field is connected to a data channel DBUS 11, to which processor 1 and working memory 2, also have access.

The set corresponding to TAG field is connected to the input of a protection logic 12, of a conventional type.

The set corresponding to the DIR field is connected to an input of comparator 8.

In order to write the DIR field a connection channel 15 is further provided from the output of MMU 3 to the third input set of fast memory 4, through a set of tristate gates 13.

The working memory 2 is started in read operation by the assertion of a signal MISS and, when the read data is available on channel DBUS 11, it asserts a signal DTACK directed to processor 1.

This signal is also used as a write command W for fast memory 4 as well as an enabling signal for gate set 13.

Comparator 8 compares the most significant portion of the physical address page, read out from fast memory 4, with the most significant portion of the physical page address stored in register 5, as well as the logical level in output from comparator 7 with the logical level "1" steadily applied at one input.

In turn, comparator 7 compares the code consisting in bits LA24-12 with the code LPA (logical page address) stored in register 6 and bit 1, stored in register 6, with the logical level 1 steadily applied to one of its inputs.

In case of a match, the comparator 7 raises its output to logical level 1.

Therefore comparator 8 outputs a HIT signal at level 1 when both comparator 7 indicates a matching of conditions and the contents of register 5 match the most significant part of the physical page address output from memory 4.

Comparator 8 has the output connected to the input of OR gate 14, which receives at a second input a timing and validation signal CK at level 0 when asserted.

In case of a mismatch detected by comparator 8, OR gate 14 outputs a MISS signal, asserted at level 0.

The operation of the described cache memory is very simple.

For sake of clarity it is assumed that the cache memory is already loaded and that registers 5,6 contain a physical page address and the corresponding logical page address already used in the course of a cache memory access with successful result.

Now, if processor 1 requests the reading of information at the next following logical address, and this address differs from the preceding one only in the offset field, the cache memory is interrogated at an address defined by the new offset and by the least significant portion of the previously used physical page address which is contained in register 5.

At the same time comparator 7 outputs a match signal indicating that the current logical page address coincides with the previously used logical page address.

The cache memory outputs the most significant portion of the physical page address of the corresponding data information in output.

This address field is compared with the address field stored in register 5, excluding that portion already used to address the cache memory.

If the two fields coincide, comparator 8 outputs signal HIT to indicate that the read out information is the requested one.

The delay at which the information is available is limited exclusively by the access time of the fast memory plus the propagation time of comparator 8.

The MMU 3 does not affect the information access time because the physical address used to reference the fast memory 4 is already contained in register 5.

Access to the cache memory is performed with a physical address and therefore any uncertainty due to possible ambiguities is avoided.

In addition, even at the level of fast memory 4, speed advantages are achieved: since the portion of page address used to reference the fast memory 4 is available before the "offset" portion, the fast memory 4 can be divided into a plurality of modules having smaller capacity, each module being addressed by the offset bit, only one of the modules being preselected for operation by the physical page address bits.

Since the speed of fast memories is inversely related to their size, it is clear that the access time is shortened.

The only circumstances in which the operative speed of the cache memory cannot be exploited are the following:

1) In subsequent read operations of the cache memory, two addresses having different logical page addresses follow each other. In this case comparator 7, hence comparator 8, provide a mismatch indication (MISS signal) independently of the absence or presence in the cache of the requested information. Owing to the MISS signal the working memory 2 is started and the requested information is read out therefrom. In addition, due to the joint assertion of MISS and PAS, the two registers 6,5 are loaded respectively with the logical page address and the corresponding physical page address of the requested information. Once the memory read operation is completed, the read out information is written in the fast memory 4 along with the corresponding physical page address. In other words the cache memory contents are updated.

2) In the course of subsequent read operation of the cache memory, the physical page address contained in register 5 does not coincide with the one stored in the cache memory at the addressed location. Even in this case the contents of fast memory 4 and registers 5,6 are updated.

3) The data read out from the cache memory is affected by a TAG code which invalidates it.

Even in this case the contents of the fast memory 4 and registers 5,6 are updated. The protection logic generates the MISS signal.

A further advantage of the cache memory of the invention can now be pointed out.

In a cache memory addressed by logical addresses at each context change a "flushing" operation is required.

In other words the whole contents of the cache memory have to be invalidated, to avoid a wrong association among logical addresses, data and corresponding physical addresses.

In the cache memory of FIG. 3 the relation between logical addresses and physical addresses is defined by the contents of registers 5,6 only.

The flushing operation is therefore limited to the reset of registers 5 and 6 which is performed at each context change, that is at each context register 10 loading.

With the first memory read operation, following a context change, the cache memory provides a MISS indication, owing to which the two registers 5,6 are loaded with a new address pair, whose association is correctly defined by MMU 3.

The same "flushing" operation is obviously performed at system and cache memory initialization as a consequence of the first time loading of context register 10.

The cache memory of the invention may be and is preferably implemented with a plurality of associations, in particular with three association sets as shown in FIG. 4.

It is known that the sequentiality criterion is independently followed in the addressing of instructions and data and it is well know, for efficiency reasons, to divide the cache into two sets, for data and instructions respectively, the two sets being read out in parallel.

Thus, for efficiency reasons, the cache of FIG. 3 should be seen as an instruction cache, or data cache, not both.

According to a further aspect of the invention, within the data environment, two data categories are defined: global data, which in the process of logical allocation may be allocated in the whole logical space and local data or stack data, which in the process of logical allocation are allocated with decreasing address order, beginning from the bottom of the logical space.

Therefore they are generally characterized by the most significant bit of logical address being at level 1.

This data distinction is followed, for instance, in some widespread operating systems.

This leads to a simple and functionally effective implementation having three association sets as the one shown in FIG. 4.

The cache of FIG. 4 comprises three fast memories 41,42,43 organized in the same way of fast memory 4 of FIG. 3, three register pairs 51,61,52,62 and 53,63 each pair having the same function as registers 5,6 of FIG. 3, three comparator pairs 71,81; 72,82 and 73,83, having the same function as the comparators of FIG. 3.

The logical page address LA24-12 is input to the three comparators 71,72,73 and the three association sets operate in parallel.

Which of the sets has to be taken into consideration for information readout, is determined by selection at output level.

The cache of FIG. 4, in addition to logical address bits LA24-12 and LA11-2 (offset), receives a signal FC (Function Code), generated by processor 1, which indicates if the requested information is an instruction or data.

Signal FC and the most significant logical address bit LA24 are input to a decoder 20 which outputs three mutually exclusive selection signals IS (instruction selected), DS (data selected), STS (Stack data selected).

Signal IS enables the data input/output of memory 41 and a tristate driver 22 connected to the output of comparator 81.

Signal DS enables the data input/output of memory 42 and a tristate driver 23 connected to the output of comparator 82.

Signal STS enables the data input/output of memory 43 and tristate driver 24 connected to the output of comparator 83.

The comparator outputs are wire ORed on the common HIT signal lead.

The data input/output terminals of the three memories 81,82,83 are connected to data channel DBUS 11.

It is clear that in case of MISS only the contents of the involved cache set is updated.

In other words the loading of registers 51,61 is controlled by the logical AND of signal MISS,PAS,IS, which must be all asserted, the loading of registers 52,62 is controlled by the logical AND of signals MISS,-PAS,DS, and the loading of registers 53, 63 is controlled by the logical AND of signals MISS,PAS,STS.

In case of context change, the three register pairs are all reset.

It is clear that if comparators 81,82,83 have a tristate output, controlled by external signal, the tristate drivers 22,23,24 are not required and the selection signals IS,DS,STS have to be input to the control input of the related comparator.

It may be further noted that the three fast memories 41,42,43 may differ in capacity.

Thus for instance the fast memory for instructions may have a capacity of 8K entries against a 4K capacity of the memories for global data and stack data.

It is further clear that the pair of comparators 7,8 (FIG. 3) and 71,81,72,82,73,83 may each be replaced with a single comparator performing the several comparisons in parallel rather than in cascade.

What is claimed is:

1. Cache memory having pseudo-virtual addressing and comprising:
   a first and a second register to respectively store a virtual/logical page address and a corresponding physical page address of current information previously read out from said cache,
   a fast memory addressed by an "offset" field of a logical address of a currently requested information, and by a portion of the physical page address stored in said second register, said fast memory outputting, if present in said cache, said currently requested information and a portion of the corresponding effective physical page address of said current information, said portion being the one which is not used for addressing said fast memory, comparison means for comparing the logical page address of said current information with the logical page address stored in said first register and for comparing the portion of physical page address output from said fast memory with a corresponding portion of the physical page address stored in said second register, said comparison means outputting a validation (HIT) signal of the current information read out from said fast memory when a comparison match is detected and a signal (MISS) for activation of a working memory when a mismatch is detected.

2. Cache memory as claimed in claim 1, comprising logical means for loading, in case of detected mismatch, said first and second register with the virtual/logical page address and the corresponding physical page address of a current information read out from said working memory respectively, and for loading said fast memory with said current information and with the portion of the related physical page address which is not used for addressing said fast memory.

3. Cache memory as claimed in claim 2 wherein at least said first register has an additional cell loaded with an information bit set at a first one of two logic levels, and said comparison means compares said information bit with a signal permanently held at said first logic level, at least said additional cell of said first register being reset to the second of said two logic levels by a context change command.

4. Cache memory as claimed in claim 1, comprising three sets of first and second registers, of fast memories and of comparison means, each set being dedicated to the handling of a specific information category, distinguished as instruction, global data and stack data, said cache memory comprising further decoding means receiving a function code and at least one of the most significant bits of a logical page address, for generating, depending on said received function code and most significant bit, selection signals for the selection of one among said sets.

* * * * *